United States Patent
Xie et al.

(10) Patent No.: US 9,959,428 B2
(45) Date of Patent: May 1, 2018

(54) PACKET GENERATION AND AUTHENTICATION IN A PROCESS CHAIN

(71) Applicant: FUJITSU LIMITED, Kawasaki-shi, Kanagawa (JP)

(72) Inventors: Liguang Xie, Milpitas, CA (US); Lei Liu, Sunnyvale, CA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 296 days.

(21) Appl. No.: 15/017,532

(22) Filed: Feb. 5, 2016

(65) Prior Publication Data

US 2017/0230339 A1    Aug. 10, 2017

(51) Int. Cl.
   *G06F 21/64*     (2013.01)
   *H04L 29/06*     (2006.01)

(52) U.S. Cl.
   CPC ............ *G06F 21/64* (2013.01); *H04L 63/123* (2013.01)

(58) Field of Classification Search
   CPC ...... G06F 21/602; G06F 21/64–21/645; H04L 9/3236–9/3242; H04L 9/3247–9/3257; H04L 63/123; H04L 67/02
   See application file for complete search history.

(56) References Cited

U.S. PATENT DOCUMENTS

| | | | | |
|---|---|---|---|---|
| 9,032,213 | B2* | 5/2015 | Mashima | H04L 9/3281 713/176 |
| 2007/0043942 | A1* | 2/2007 | Wong | G06F 21/57 713/151 |
| 2015/0006475 | A1* | 1/2015 | Guo | G06F 17/30159 707/609 |
| 2016/0094553 | A1* | 3/2016 | Azgin | H04L 45/7453 713/154 |

OTHER PUBLICATIONS

J.F. Kurose and K.W. Ross. "Computer Networking: A Top-Down Approach", Pearson; 6th edition (Mar. 5, 2012), ISBN-13: 978-0132856201.

* cited by examiner

*Primary Examiner* — Kevin Bechtel
(74) *Attorney, Agent, or Firm* — Maschoff Brennan (57) ABSTRACT

A method of verifying a data packet by a data consumer may be provided. The method may include authenticating a first signature in a signature stack of a data packet, where the first signature corresponds to a hashed first content in a content stack, and the first signature is generated at a first network location. The method may additionally include authenticating a second signature in the signature stack of the data packet, where the second signature corresponds to second content in the content stack, and the second signature is generated at a second network location. The second content may include a processed version of the first content and may be generated at the second network location.

20 Claims, 8 Drawing Sheets

| NAME | Flag | Content | Signature |
|---|---|---|---|
| | | Content D | Signature D |
| | ✓ | Hashed C | Signature C |
| | ✓ | Hashed B | Signature B |
| | | Hashed A | Signature A |
| | | | |
| ... | ... | ... | ... |

PACKET GENERATION AND AUTHENTICATION IN A PROCESS CHAIN

FIELD

The embodiments discussed herein are related to packet generation and/or authentication in a process chain.

BACKGROUND

Increases in the prevalence of computing devices and of data generated, there are some circumstances in which data is processed multiple times before it is in a usable format. However, such conversion may create difficulties in verifying the data.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of verifying a data packet by a data consumer. The method may include authenticating a first signature in a signature stack of a data packet, where the first signature corresponds to a hashed first content in a content stack and, the first signature is generated at a first network location. The method may additionally include authenticating a second signature in the signature stack of the data packet, where the second signature corresponds to a processed and unhashed second content in the content stack, and the second signature is generated at a second network location. The processed and unhashed second content may include a processed version of the first content and is generated at the second network location.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

The present disclosure relates to packet authentication in a process chain. A process chain, for example, may include a series of processing steps to transform data from one form to another such as video processing, compression, and encoding, among other processes. Rather than only verifying a final product of a process chain, a data packet including a content stack and a signature stack may be used to facilitate verification of intermediate steps and/or data in the process chain. The content stack may be used to store content or representations of the content used during the process chain. The signature stack may be used to store signatures verifying the process, content, etc. of the intermediate steps during the process chain. As each step of processing is performed in the process chain, a new signature may be generated verifying the process and/or the content generated using the process, etc. and added to the signature stack. Additionally or alternatively, with each step, the data used during that particular processing step in the process chain may be hashed or otherwise truncated and then placed in the content stack to allow for verification of the content used during the process chain while also limiting the size of the data packet.

For example, if the process chain included compressing a video and then changing its format, an initial data packet may include the raw video in the content stack of the initial data packet. A signature may also be generated at the location of the raw video and placed in the signature stack of the initial data packet.

At the first step in the process chain, the raw video may be compressed. In the content stack of the data packet, the raw video may be replaced with a hashed version of the data of the raw video, and the compressed video may be added to the content stack. A second signature may be generated based on the compressed video and added to the signature stack. The data packet, with the updated signature and content stack, may then be sent to another location to perform the next step in the processing chain: changing the format of the video.

The compressed video may be processed to change the format of the video. The data representing the original compressed video may be hashed and the hashed values may be placed in the content stack in place of the original compressed video. The new format video may be added to the content stack. A third signature may be generated based on the new format video and added to the signature stack. As a result, the data packet after the formatting part of the process may include a content stack with the new format video and hashed representations of the compressed video and the raw video and a signature stack with the three signatures in the signature stack. By generating a data packet with the content and signature stacks as described, a data consumer who receives the data packet with the new format compressed video may authenticate the signature for each step in the process chain and/or may verify the hashed data for each step in the process chain. Such authentication may allow a data consumer to authenticate each step in the process chain, rather than only the last step and the last location in the process chain.

Embodiments of the present disclosure are explained with reference to the accompanying drawings.

Figure 1:
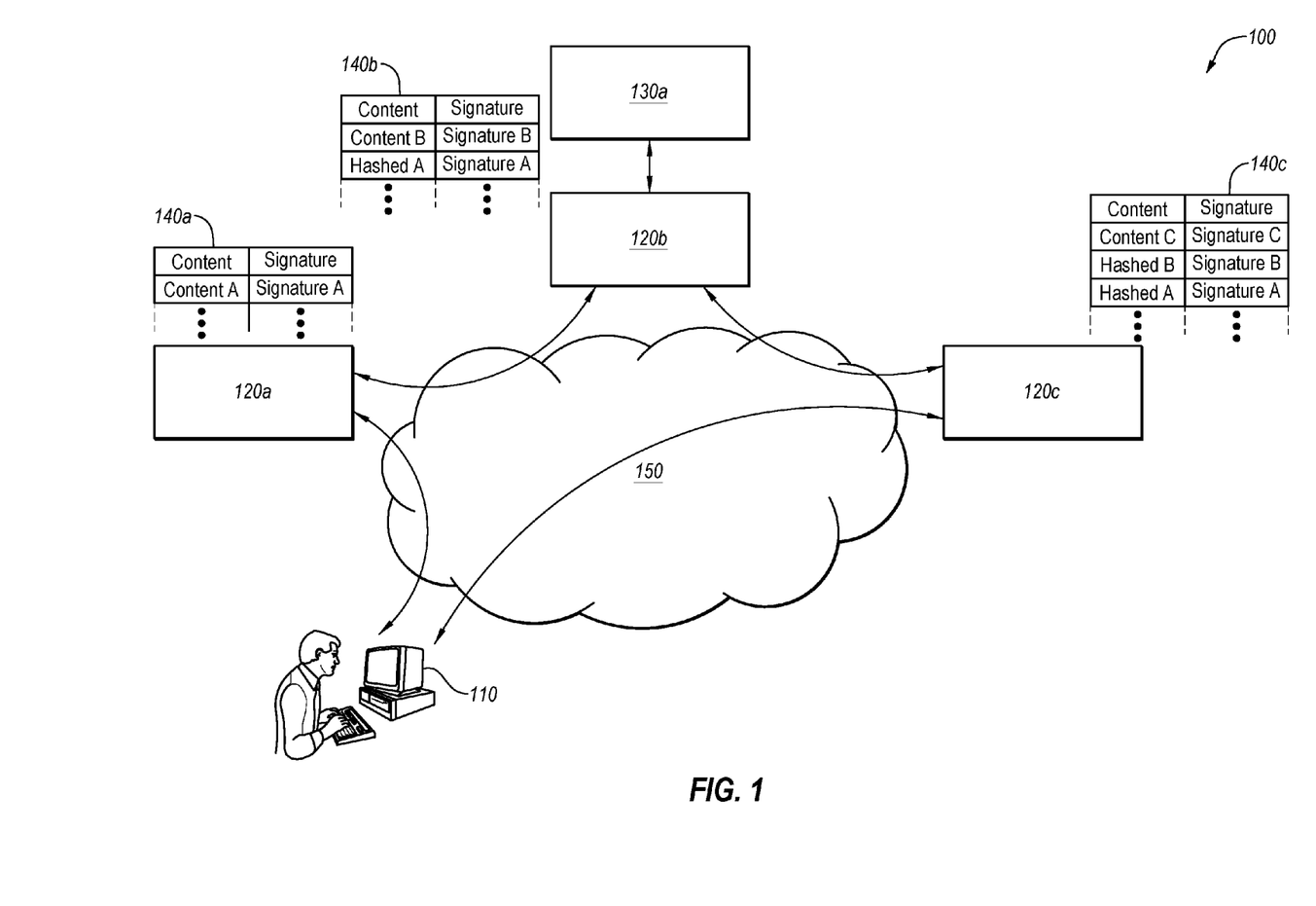
FIG. 1 is a diagram representing an example system for verifying a packet.

FIG. 1 is a diagram representing an example system 100 for verifying a packet, according to at least one embodiment of the present disclosure. The system 100 may include a data consumer 110 that may communicate with one or more network devices 120 (e.g., network devices 120a, 120b, and/or 120c). The data consumer 110 may request processed data from the network device 120a. The network device 120a may store or otherwise have access to raw data that may eventually yield the processed data requested by the data consumer 110 after one or more processing steps. Such a series of one or more processing steps may be referred to as a process chain. The system 100 may include one or more processing devices 130, such as the processing device 130*a*, that may perform one or more processing steps of the processing chain. Additionally or alternatively, one or more of the network devices 120 may be configured to perform one or more of the processing steps of the processing chain. The data consumer 110 and/or the network devices 120 may communicate data before, during, and after a process chain using a data packet 140 over a network 150.

In some embodiments, as the data is processed according to the process chain, verification of the data may be available at one or more of the intermediate steps, rather than only the last step of the processing chain. For example, a data packet 140 may be utilized that may include a content stack and a signature stack. The content stack may include data, including raw data, processed data, hashes of data, truncated data, etc. and the signature stack may include verification information for content and/or for locations that perform processing steps of a process chain.

One example of a process chain may include processing steps associated with a video such as compressing, changing format, varying audio outputs, etc. As another example, a process chain may include processing steps associated with medical data, such as compiling raw data from sensors disposed about the body of a patient, filtering the data, modeling the data, and running a simulation with the data. Any size process chain for any data is contemplated within the scope of the present disclosure. In some embodiments, the steps of a process chain may be order-dependent (e.g., a specific order) or may be order-independent (e.g., may be done in any order), or may be mixed (e.g., some steps may be done in any order while others have a specific order). In these and other embodiments, the present disclosure may include verification for each step in the process chain.

For illustrative purposes, a process chain associated with FIG. 1 may include a first processing step performed at the processing device 130*a* and a second processing step performed at the network device 120*c*. After the data consumer has requested data from the network device 120*a*, the network device 120*a* may obtain raw data as an initial input into the process chain. For example, the network device 120*a* may retrieve raw data (Content A) from a local storage medium or an external device. The network device 120*a* may generate a data packet 140*a* that may include the raw data (Content A) in a content stack. The network device 120*a* may generate a signature (Signature A) that verifies the authenticity of the Content A and/or that verifies credentials of the network device 120*a*. In some embodiments, the Signature A may be generated based on a private key accessible by the network device 120*a* and verifiable by a public key associated with the private key of the network device 120*a*. In these and other embodiments, the Signature A may be based on the Content A and any associated header and/or name of the data packet 140*a*. After generating the Signature A, the network device 120*a* may transmit the data packet 140*a* with the Signature A and the Content A to the network device 120*b*.

In some embodiments, the network device 120*b* may retrieve the Content A and pass the Content A to the processing device 130*a* to perform processing on the Content A. The processing performed at the processing device 120*b* may yield Content B. For example, if the Content A were a video file, the Content B may include a compressed video file, or a video file of another format. As another example, if the Content A were medical data from sensors, the Content B may include filtered data. The processing device 130*a* may pass the Content B to the network device 120*b*. The network device 120*b* may modify the data packet 140*a* to arrive at the data packet 140*b*. For example, the network device 120*b* may run a hash function on the Content A to generate the Hashed A and replace the Content A in the data packet 140*a* with the Hashed A. Additionally or alternatively, the network device 120*b* may add (e.g., by prepending) the Content B to the content stack above the Hashed A. The network device 120*b* may generate a Signature B. The Signature B may authenticate the Content B, the process used to generate the Content B, and/or the network device 120*b*. The network device 120*b* may add (e.g., by prepending) the Signature B to the signature stack of the data packet 140*a*, yielding the data packet 140*b*.

Alternately or additionally, in place of replacing and/or adding content to the data packet 140*a* to yield the data packet 140*b*, the network device 120*b* may discard the data packet 140*a* and may construct the data packet 140*b* using the Hashed A, the Content B, the Signature A, and the Signature B.

In some embodiments, the hash of the Content A may be performed using a fixed length hash function, such as a hush function limited to 1024 or 2048 bits such that the data packet is limited in size, rather than maintaining the raw Content A in addition to the Content B.

The network device 120*b* may transmit the data packet 140*b* to the network device 120*c* for an additional step of processing in the process chain. The network device 120*c* may operate similar to the network device 120*b*, although the network device 120*c* may perform the processing of the processing chain rather than providing the data to the processing device 130*a* or other processing device. For example, the network device 120*c* may generate Content C by performing processing on the Content B. In some embodiments, the network device 120*c* may hash the Content B to yield Hashed B and replace Content B with the Hashed B in the data packet 140*c*. In these and other embodiments, the network device 120*c* may prepend the Content C to the content stack and may generate and prepend Signature C to the signature stack of the data packet 140*c*. Alternately or additionally, in place of replacing and/or adding content to the data packet 140*b* to yield the data packet 140*c*, the network device 120*c* may discard the data packet 140*b* and may construct the data packet 140*c* using the Hashed A, the Hashed B, the Content C, the Signature A, the Signature B, and the Signature C.

The network device 120*c* may transmit the data packet 140*c* to the data consumer 110. In some embodiments, the network device 120*c* may transmit the completed data packet 140*c* back to the network device 120*a* for the network device 120*a* to provide the data packet 140*c* to the data consumer 110.

In some embodiments, the network device 120*c* may authenticate the Signature A and the Signature B prior to performing the processing to yield the Content C. Additionally or alternatively, the network device 120*c* may authenticate the top signature in the signature stack (the Signature B) prior to performing the processing to yield the Content C.

The data consumer 110 may authenticate one or more of the signatures in the signature stack of the data packet 140*c*. For example, the data consumer 110 may use a public key associated with the private key of the network device 120*a* to authenticate the Signature A, may use a public key associated with the private key of the network device 120*b* to authenticate the Signature B, and/or may use a public key associated with the private key of the network device 120*c* to authenticate the Signature C. Additionally or alternatively, the data consumer 110 may authenticate the hashed values of the content (e.g., Hashed A, Hashed B).

Figure 4:
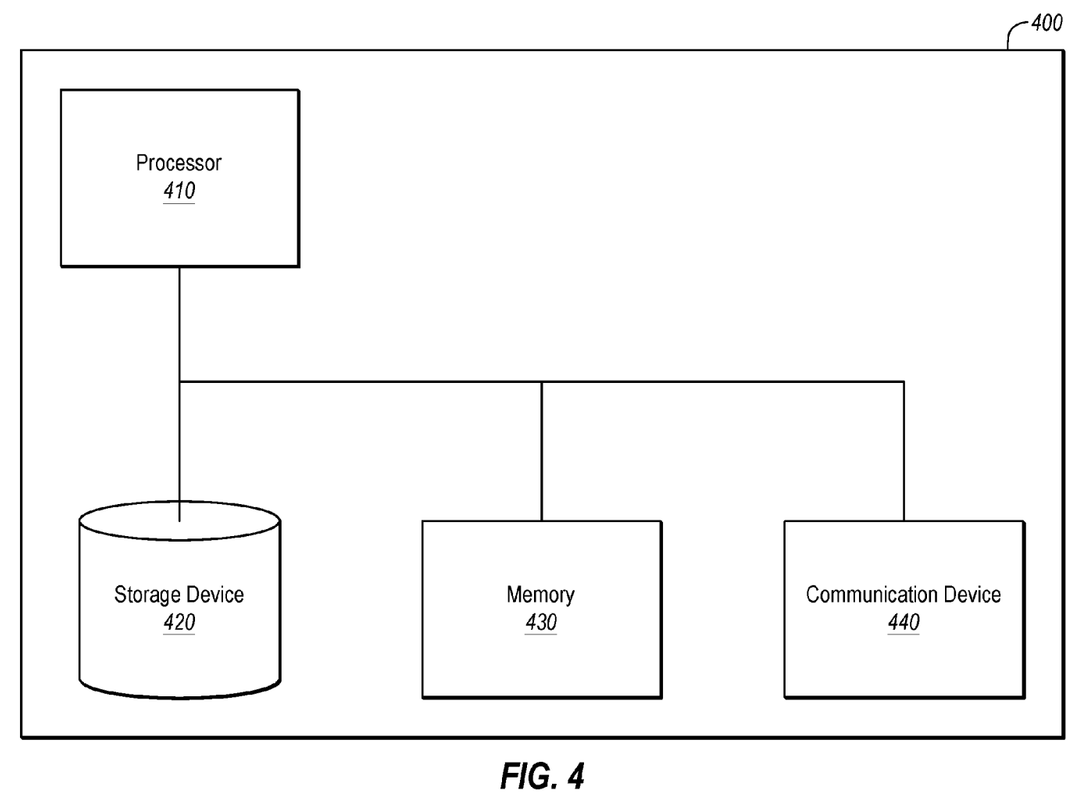
FIG. 4 is a block diagram of an example computing device.

Any of the data consumer 110, the network devices 120 (e.g., the network devices 120a, 120b, and 120c), and/or the processing devices 130 (e.g., the processing device 130a) may be implemented as a computing device, such as the computing device 400 illustrated and described in FIG. 4. In some embodiments, the data consumer 110 may include a computer (such as a desktop, laptop, server, etc.), a mobile device (such as a cellular telephone, personal digital assistant (PDA), tablet, etc.), or any other device connected to the network 150 (such as a network-enabled thermostat, refrigerator, or other appliance). In some embodiments, the network devices 120 may include a router, a gateway, a switch, or any other network element.

The network 150 may include any device, system, component, or combination thereof configured to provide communication between one or more of the data consumer 110, the network devices 120, and/or the processing devices 130. By way of example, the network 150 may include one or more wide area networks (WANs) or local area networks (LANs) in communication. In some embodiments, the network 150 may include the Internet, including a global internetwork formed by logical and physical connections between multiple WANs and/or LANs. Additionally or alternatively, the network 150 may include one or more cellular RF networks and/or one or more wired and/or wireless networks such as, but not limited to, 802.xx networks, Bluetooth® access points, wireless access points, IP-based networks, or the like. The network 150 may also include servers, substations, or other connection devices that enable one type of network to interface with another type of network. Additionally or alternatively, the network 150 may include an Intranet, or one or more computing devices in communication within an organization or an in otherwise secure manner.

In some embodiments, the system 100 may be an information centric networking (ICN) network. In these and other embodiments, the data consumer 110 requesting data may take the form of an interest packet. In some embodiments, the interest packet may identify each step in the processing chain. For example, the interest packet from the data consumer 110 may identify the processing step performed at the processing device 130a and the processing step performed at the network device 120c. In some embodiments, after processing has been performed, a name of the data packet 140 may be changed. For example, after the processing at the processing device 130a has been performed and before routing the new data packet according to the pending interest table (PIT), the network device 120b may change the name of the data packet 140b to reflect the performance of the processing. In these and other embodiments, after a processing step is completed in the process chain, the updated data packet 140 may be routed according to the PIT. In these and other embodiments, after the processing chain is completed, the completed data packet may flow back along the path of pending interest packets to the data consumer 110.

In some embodiments, a network device may function to merge multiple downstream branches of a processing chain. For example, (following an additional example for FIG. 1), an additional processing chain may include multiple steps in processing (not illustrated, referred to as a first branch and yielding Content D) which may arrive at the network device 120b. Content, signatures, and hashes may be generated in the first branch of the additional processing chain as described in the present disclosure. For example, a packet may arrive at the network device 120b with a Content D and a Hashed E in a content stack and a Signature D and a Signature E in a signature stack. The processing and/or data from the network devices 120a may be referred to as a second branch. The network device 120b may perform processing using both the Content D and the Content A to generate the Content B.

In some embodiments, the network device 120b may generate a single packet that combines both branches. For example, the network device 120b may append all content from the first branch as entries in a content stack of the single packet and the network device 120b may append all content from the second branch as further entries in the content stack of the single packet. Additionally or alternatively, the network device 120b may append all signatures from the first branch as entries in a signature stack of the single packet and all signatures from the second branch as entries in the signature stack of the single packet. In some embodiments, the network device 120c may utilize an additional content stack and signature stack beginning with the Content B and the Signature B rather than adding the Content B and the Signature B to the content stack and signature stack of the single packet. Additionally or alternatively, the network device 120c may utilize a single content stack and signature stack, with large entries for each branch. For example, all of the content from the first branch may be combined into a first entry of the content stack and all of the content from the second branch may be combined into a second entry of the content stack. Additionally or alternatively, all of the signatures from the first branch may be combined into a first entry of the signature stack and all of the signatures from the second branch may be combined into a second entry of the signature stack.

In some embodiments, for example, in ICN networks, the order of content and signature for each branch in a packet merging branches may follow the visiting order of Interests. In some embodiments, the network device 120b may combine the branches even if the network device 120b may not perform processing in the process chain at the network device 120b or the processing device 130a. In these and other embodiments, the order of branches may follow the order utilized in any processing, the order in which the packets are received from the branches chronologically, or may follow any other order.

Modifications, additions, or omissions may be made to FIG. 1 without departing from the scope of the present disclosure. For example, the system 100 may include more or fewer elements than those illustrated and described in the present disclosure. For example, the system 100 may include many more network devices, processing devices, and/or data consumers arranged in any topology. Additionally or alternatively, any length or combination of processing chain may be utilized.

Figure 2:
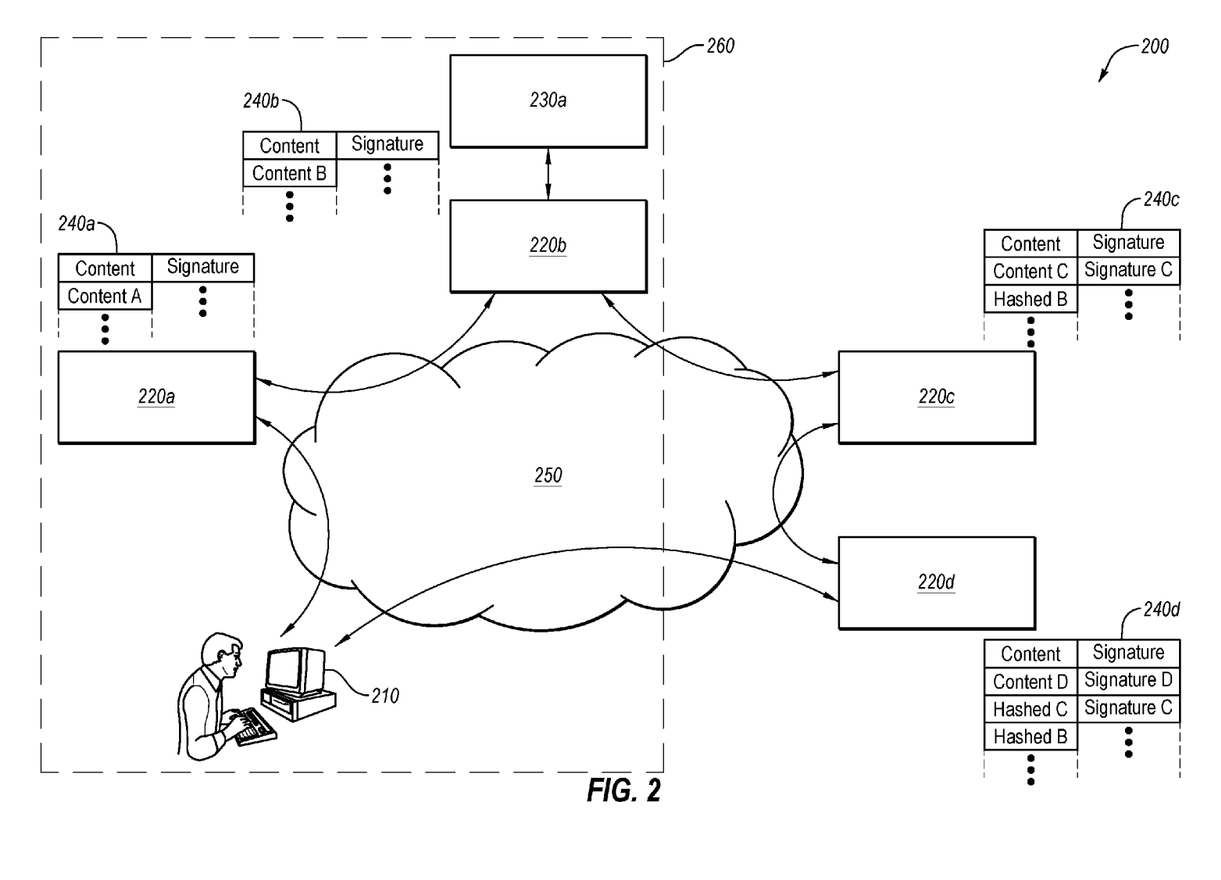
FIG. 2 is a diagram representing an example system, including a trusted zone, for verifying a packet.

FIG. 2 is a diagram representing an example system 200, including a trusted zone 260, for verifying a packet, in accordance with one or more embodiments of the present disclosure. The system 200 may be similar or analogous to the system 100 of FIG. 1. For example, the data consumer 210 may be similar or analogous to the data consumer 110 of FIG. 1, the network devices 220 may be similar or analogous to the network devices 120 of FIG. 1, the processing devices 230 may be similar or analogous to the processing devices 130 of FIG. 1, and the network 250 may be similar or analogous to the network 150 of FIG. 1. As with the system 100 FIG. 1, in some embodiments, the system 200 of FIG. 2 may be implemented in an ICN network.

The trusted zone 260 may represent a region within which the data consumer 210 has a certain level of established trust. For example, the trusted zone 260 may include an Intranet, a secure network, a secure building, etc. In some embodiments, the network devices 220a and 220b operating within the trusted zone 260 may refrain from adding signatures to the signature stack of a data packet. Additionally or alternatively, the network devices 220a and 220b operating within the trusted zone 260 may refrain from hashing raw data to add to the content stack, and may replace unprocessed data with processed data. In these and other embodiments, the network devices 220c and 220d operating outside of the trusted zone 260 may add signatures to the signature stack after processing of data is performed. Additionally or alternatively, the network devices 220c and 220d may hash raw data, replace the raw data in the content stack with the hashed data, and add the processed data to the content stack. In these and other embodiments, the network devices 220c and 220d may operate in a similar manner to the network devices 120b and 120c of FIG. 1.

For illustrative purposes, a process chain associated with FIG. 2 may include a first processing step performed at the processing device 230a, a second processing step performed at the network device 220c, and a third processing step performed at the network device 220d. The data consumer 210 may request data according to the process chain from the network device 220a. The network device 220a may have access to the raw data (Content A) for the process chain. Because the network device 220a is within the trusted zone 260, the network device 220a may refrain from generating a signature based on the Content A and may send the data packet 240a to the network device 220b with the Content A in the content stack and an empty signature stack. The network device 220b may provide the Content A to the processing device 230a to perform processing of the Content A to generate the Content B. Because the network device 220b is within the trusted zone 260, the network device 220b may replace the Content A with the Content B in the content stack. Additionally or alternatively, the network device 220b may refrain from generating a signature based on the Content B and may transmit the data packet 240b to the network device 220c outside of the trusted zone 260.

At the network device 220c, the Content B may be hashed and the Content B may be replaced with the hashed Content B in the content stack of the data packet 240c. Additionally or alternatively, the Content B may be processed to generate Content C and the Content C may be added (e.g., prepended) to the content stack of the data packet 240c. Additionally or alternatively, the network device 220c may generate a signature (e.g., Signature C) based on the Content C that may be added to the signature stack of the data packet 240c. In some embodiments, the Signature C may also be based on the Hashed B and/or any name or header of the data packet 240. The network device 220c may transmit the data packet 240c to the network device 220d.

The network device 220d may operate in a similar manner to the network device 220c. For example, the network device 220d may perform processing on the Content C to generate Content D. The network device 220d may hash the Content C to generate Hashed C. The network device 220d may replace the Content C with the Hashed C in the content stack of the data packet 240d. The network device 220d may add the Content D to the content stack of the data packet 240d. The network device 220d may generate a Signature D and may add the Signature D to the signature stack of the data packet 240d. The network device 220d may provide the data packet 240d to the data consumer 210, for example, by transmitting the data packet 240d to the data consumer 210, or by transmitting the data packet 240d to the network device 220a to provide the data packet 240d to the data consumer 210, etc.

In some embodiments, there may be multiple levels of trust and multiple trust zones of varying levels of trust. For example, a first network device at a highest trust level trust zone may replace content in the content stack with processed data without maintaining hashed content of the raw data and may also not generate or store signatures in the signature stack. As another example, a second network device at a second trust level trust zone may retain hashed raw data in the content stack and may not generate or store signatures in the signatures tack. Additionally or alternatively, the second network device may replace raw data in the content stack with processed data and may generate a signature to be added to the signature stack.

Modifications, additions, or omissions may be made to FIG. 2 without departing from the scope of the present disclosure. For example, the system 200 may include more or fewer elements than those illustrated and described in the present disclosure. For example, the system 200 may include many more network devices, processing devices, and/or data consumers arranged in any topology. Additionally or alternatively, any length or combination of processing chain may be utilized. As another example, any number and/or size of trusted zones may be utilized.

Figure 3:
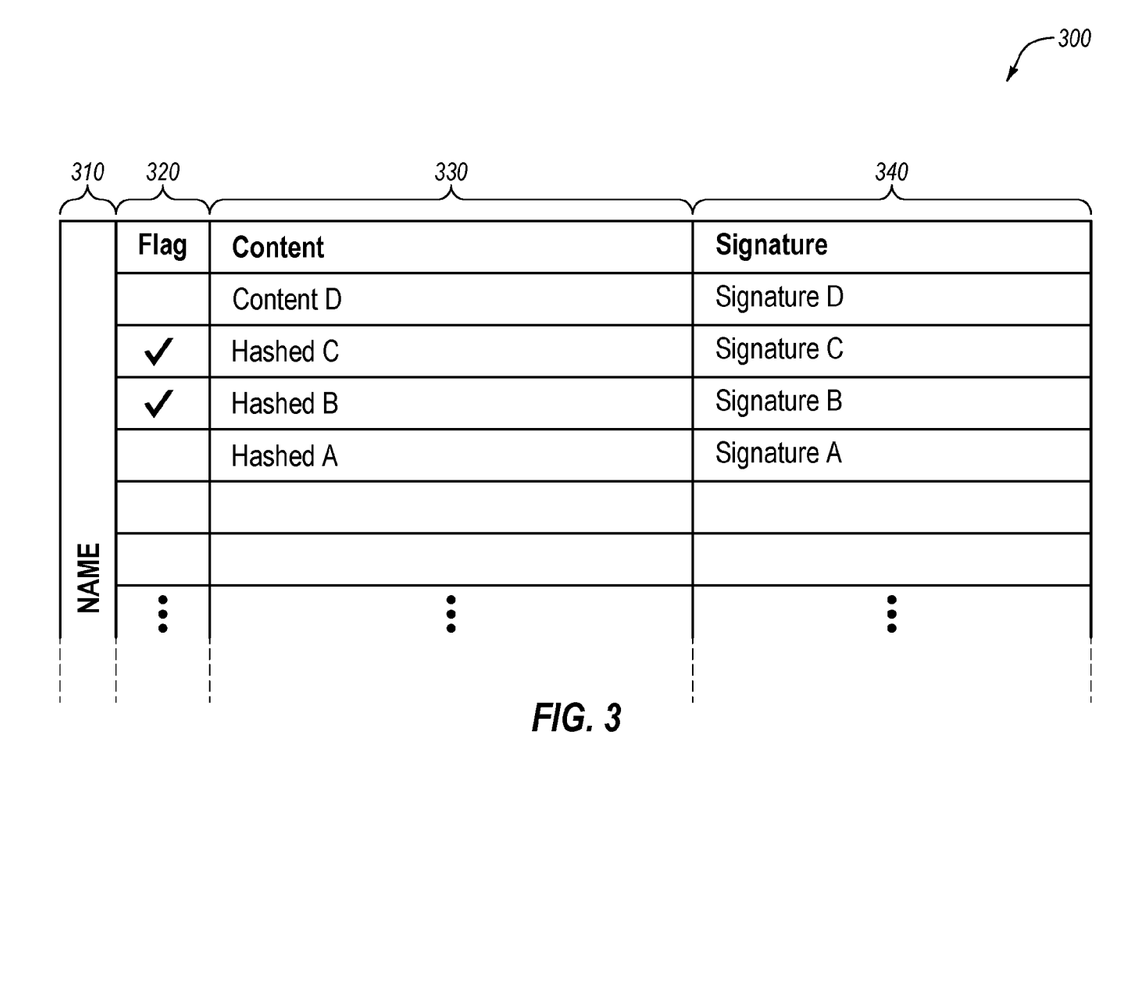
FIG. 3 is an example schematic of a data packet.

FIG. 3 is an example schematic of a data packet 300, in accordance with one or more embodiments of the present disclosure. The data packet 300 may include a name field 310, a flag field 320, a content stack 330, and a signature stack 340.

The name field 310 may maintain a name and/or header of the data packet 300. For example, in an ICN network the name field 310 may store the name of the content by which the content is addressed in the ICN network. Additionally or alternatively, the name may include one or more of the processing steps in a process chain to which contents of the data packet 300 may be subject. In these and other embodiments, the name field 310 may be changed or modified after processing has been performed and/or other fields or stacks of the data packet 300 have changed.

The content stack 330 may include one or more sets of data. In some embodiments, the content stack 330 may include one full set of data (e.g., Content D) and hashed values of the data for one or more of the preceding step of processing in a processing chain. For example, the content stack 330 may include: Hashed C, where Content C was processed to generate Content D; Hashed B, where Content B was processed to generate Content C; and Hashed A, where Content A was processed to generate Content B. Additionally or alternatively, the content stack 330 may include a subset of the data of preceding steps of processing in a process chain. For example, if one or more of the processing steps were performed at locations in a trusted zone, the content stack 330 may exclude the raw content or the hash of the raw content processed at those locations.

The signature stack 340 may include one or more signatures that are generated based on corresponding content. For example, the Signature A may be generated based on the Content A, the Signature B may be based on the Content B, etc. Additionally or alternatively, the signatures of the signature stack 340 may be based on the data packet 300 prior to the addition of the signature during the processing chain. For example, the Signature C may be based off of the Content C, the Hashed B, and the Hashed A, and the Signature D may be based off of the Content D, the Hashed C, the Hashed B, and the Hashed A. Additionally or alternatively, the signatures of the signature stack 340 may be based on a header or name associated with the content and/or the data packet 300. For example, the Signature D may be based on both the Content D and a header or name of the data packet 300.

The flag field 320 may include a security flag indicating whether or not a signature has been verified. For example, the flag field may have a flag set indicating that the Signature B has been verified. To set the flag, a network device may authenticate a signature. For example, the network location that processed and hashed the Content B to generate the Content C may authenticate the Signature B prior to performing such operations, and may set the security flag indicating that the Signature B has been authenticated. For example, the network location may use a public key to verify the Signature B. In some embodiments, a network device may only authenticate signatures without a flag set in the flag field 320 and may treat signatures with a flag set in the flag field 320 as authenticated. Additionally or alternatively, a data consumer may only authenticate signatures without a flag set in the flag field 320. As a result, each step of a processing chain may authenticate a previous step and indicate such in the flag field. As a result, a data consumer may authenticate the last process and all other process may have been authenticated previously by other devices.

Modifications, additions, or omissions may be made to FIG. 3 without departing from the scope of the present disclosure. For example, the data packet 300 may include more or fewer elements than those illustrated and described in the present disclosure. For example, the data packet 300 may include other fields than those illustrated. As another example, the data packet 300 may exclude some fields, such as the name field 310 and/or the flag field 320.

FIG. 4 is a block diagram of an example computing device 400, in accordance with at least one embodiment of the present disclosure. Any of the data consumer 110, the network devices 120, the processing devices 130 of FIG. 1, the data consumer 210, the network devices 220, and/or the processing devices 230 of FIG. 2 may be implemented as the computing device 400. The computing device 400 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

The computing device 400 may include a processor 410, a storage device 420, a memory 430, and a communication device 440. The processor 410, the storage device 420, the memory 430, and/or the communication device 440 may all be communicatively coupled such that each of the components may communicate with the other components. The computing device 400 may perform any of the operations described in the present disclosure.

In general, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 410 may include any number of processors configured to perform, individually or collectively, any number of operations described in the present disclosure.

In some embodiments, the processor 410 may interpret and/or execute program instructions and/or process data stored in the storage device 420, the memory 430, or the storage device 420 and the memory 430. In some embodiments, the processor 410 may fetch program instructions from the storage device 420 and load the program instructions in the memory 430. After the program instructions are loaded into memory 430, the processor 410 may execute the program instructions.

For example, in some embodiments one or more of the processing operations of a process chain may be included in the data storage 420 as program instructions. The processor 410 may fetch the program instructions of one or more of the processing operations and may load the program instructions of the processing operations in the memory 430. After the program instructions of the processing operations are loaded into the memory 430, the processor 410 may execute the program instructions such that the computing device 400 may implement the operations associated with the processing operations as directed by the program instructions.

The storage device 420 and the memory 430 may include computer-readable storage media for carrying or having computer-executable instructions or data structures stored thereon. Such computer-readable storage media may include any available media that may be accessed by a general-purpose or special-purpose computer, such as the processor 410. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

In some embodiments, the storage device 420 and/or the memory 430 may store data associated with an ICN network. For example, the storage device 420 and/or the memory 430 may store a PIT, a forwarding information base (FIB), and/or a content store.

In some embodiments, a content store may operate as a storage location for content which has been requested by another device in a network. By implementing one or more network devices in the network with content stores, content that is frequently requested may be located in the content stores of multiple network devices and may be provided to devices requesting the content more quickly and/or efficiently.

In some embodiments, a PIT may serve as a status indicator of what interest packets have been received by a network device for which the network device is still awaiting a data packet. For example, the PIT may have table entries associating requested content with interfaces of the network device that have received interest packets requesting the content. The PIT may be used when a data packet is received by the network device to identify which interfaces have requested the content in that data packet so the data packet may be sent out from the network device on the interfaces that requested the content, referred to as requesting interfaces.

In some embodiments, an FIB may be a database, set of rules, protocols, or the like by which a network device may determine where to forward an interest packet when received by the network device. For example, when an interest packet is received at the network device, the FIB may be utilized to determine which interface or interfaces of the network devices are used to transmit the interest packet to request the content.

The communication device 440 may include any device, system, component, or collection of components configured to allow or facilitate communication between the computing device 400 and a network (e.g., the network 150 of FIG. 1 or the network 250 of FIG. 2) For example, the communication device 440 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication device 440 may permit data to be exchanged with any network (including the network 150) such as a cellular network, a Wi-Fi network, a MAN, an optical network, etc., to name a few examples, and/or any other devices described in the present disclosure, including remote devices.

In some embodiments, the communication component 440 may be used by the computing device 300 to communicate within an ICN network. For example, the communication device 440 may include one or more interfaces. In some embodiments, the communication device 440 may include logical distinctions on a single physical component, for example, multiple interfaces across a single physical cable or optical signal.

Modifications, additions, or omissions may be made to FIG. 4 without departing from the scope of the present disclosure. For example, the computing device 400 may include more or fewer elements than those illustrated and described in the present disclosure. For example, the computing device 400 may include an integrated display device such as a screen of a tablet or mobile phone or may include an external monitor, a projector, a television, or other suitable display device that may be separate from and communicatively coupled to the computing device 400.

Figure 5A:
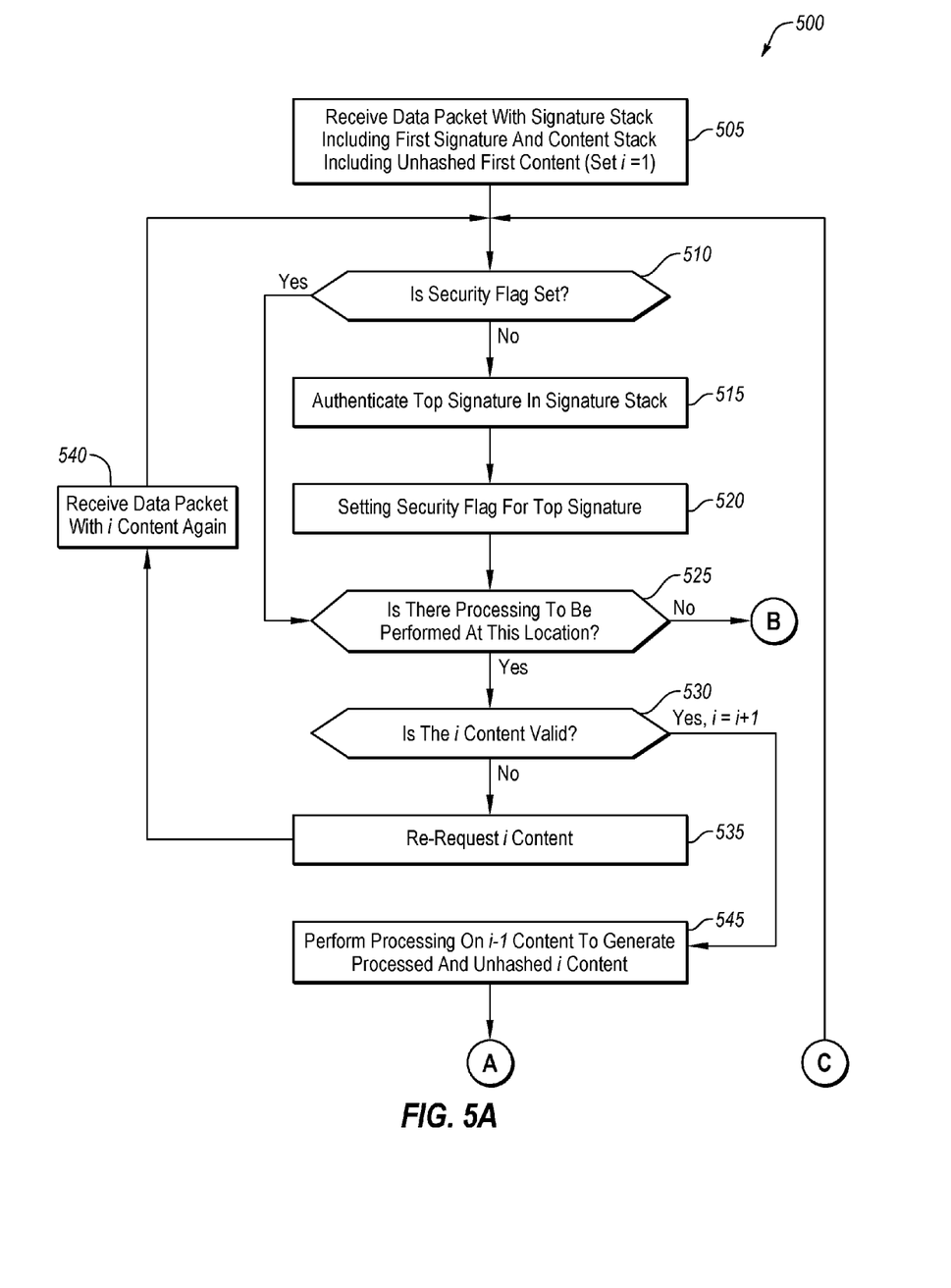
FIGS. 5A and 5B are a flowchart of an example method for verifying a packet.
Figure 5B:
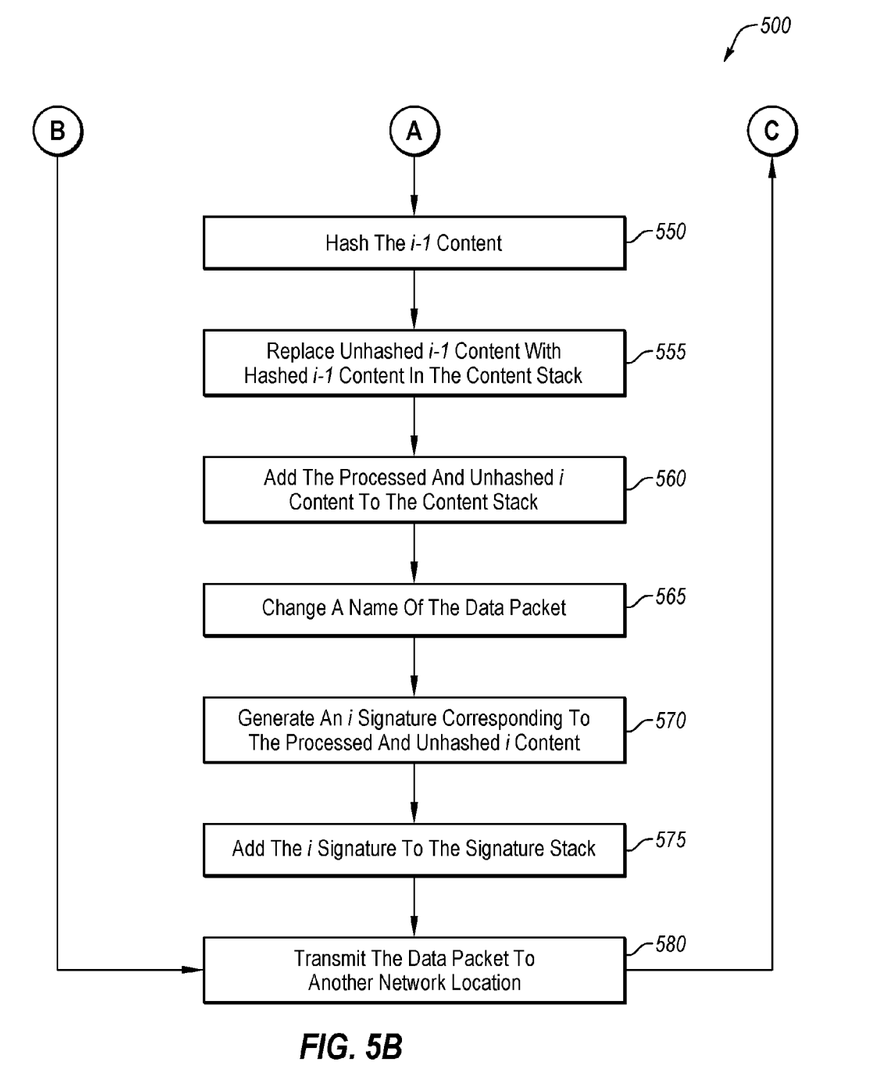

FIGS. 5A and 5B are a flowchart of an example method 500 to verify a packet, in accordance with at least one embodiment of the present disclosure. The method 500 may be performed by any suitable system, apparatus, or device. For example, the system 100 of FIG. 1 or one or more of the components thereof or the system 200 of FIG. 2 or one or more of the components thereof may perform one or more of the operations associated with the method 500. In these and other embodiments, program instructions stored on a computer readable medium may be executed to perform one or more of the operations of the method 500.

At block 505, a data packet (e.g., the data packet 140*a* of FIG. 1) may be received at a first network device (e.g., the network device 120*b* of FIG. 1) from an initial network device (e.g., the network device 120*a* of FIG. 1). The data packet may include a signature stack with a first signature and a content stack with an unhashed first content. Additionally, for convenience in describing the method 500, a variable i representing the step in a processing chain may be set to one.

At block 510, a determination may be made by the first network device as to whether a security flag has been set in the data packet. For example, a determination may be made as to whether the data packet includes a flag field, whether all signatures have flags, or whether any of the signatures have flags. If it is determined that a security flag has been set for all or for the most recent signature, the method 500 may proceed to block 525. If it is determined that a security flag has not been set, the method 500 may proceed to block 515.

At block 515, the top signature in the signature stack may be authenticated by the first network device. For example, the top signature may be verified using a public key available to authenticate that the signature was generated using a private key at a particular network device. Additionally or alternatively, any other digital verification or authentication approach may be used to generate and authenticate the signature. The signature at the top of the stack may correspond to the i content generated during the i step in the process chain.

At block 520, the security flag in the data packet associated with the top signature in the signature stack may be set by the first network device to signify that the signature has been authenticated. Setting the flag may include changing a bit in the data packet, or any other indication that a flag has been set in a flag field of the data packet associated with the i signature.

At block 525, a determination may be made by the first network device as to whether there is processing to be performed at the present location. Such processing may include processing to be performed at the first network device or at a first processing device (e.g., the processing device 130*a* of FIG. 1) associated with the first network device. For example, in some embodiments, a name in the data packet may indicate a function to be performed in the process chain that may be performed at the first network device or associated first processing device. If there is processing to be performed, the method 500 may proceed to block 530. If there is not processing to be performed, the method 500 may proceed to the block 580 (via element B, continuing on FIG. 5B).

At block 530, a determination may be made whether the content i is valid. For example, the first network device and/or the first processing device may analyze the content i to verify that it is valid for the processing to be performed in the process chain. For example, if the process is to compress a video, a determination may be made as to whether the video file is complete, or if the video file has been corrupted during transmission. If the content i is not valid, the method 500 may proceed to block 535. If the content i is valid, the method 500 may proceed to block 545 and increment the value of i by one.

At block 535, a request may be sent to re-request the content i. For example, the first network device or associated first processing device may send a request to the initial network device to re-transmit the content i.

At block 540, a data packet with content i may be received again. For example, the first network device may receive the data packet with replacement content i from the initial network device. The method 500 may then proceed to block 510 to inquire whether the data packet with the content i has a security flag set.

At block 545, after confirmation that the content i is valid and incrementing the value of i by one, processing may be performed on the i−1 content to generate processed and unhashed content i. For example, the first network device and/or the first processing device may perform the processing of the process chain on the raw content (i−1, received from the previous processing network device) to generate the processed data (i, generated through the processing). For example, if the content i−1 is a video file, the first processing device may compress the video file to generate a compressed video file, content i. After block 545, the method 500 may continue on FIG. 5B via element A.

At block 550, continuing from element A on FIG. 5B, the i−1 content may be hashed. For example, the first network device may hash the i−1 content using a fixed-length hashing algorithm to generate a certain length of bits based on the i−1 content received from the initial network device. For example, if the i−1 content is a raw video file, the hashed i−1 content may include a series of values generated based on a hashing algorithm performed on the data representative of the raw video file.

At block 555, the unhashed i−1 content may be replaced with the hashed i−1 content in the content stack of the data packet. For example, the first network device may remove the unhashed i−1 content and prepend the hashed i−1 content to the content stack. If the content stack is empty, this may include placing the hashed i−1 content as the first and/or only entry in the content stack. Following the video example, the values of the hashing algorithm based on the raw video file (hashed i−1) may be prepended to the content stack.

At block 560, the processed and unhashed i content may be added to the content stack. For example, the first network device may prepend the processed and unhashed i content to the content stack, placing the processed and unhashed i content at the top of the content stack. Following the video example, the compressed video (processed and unhashed content i) may be prepended to the content stack such that it is above the values of the hashing algorithm based on the raw video file (hashed i−1).

At block 565, a name of the data packet may be changed. For example, the first network device may alter the name to reflect the processing that occurred at block 545. Any other heading or identifying information of the data packet may also be changed or modified to reflect the change in the content stack of the data packet.

At block 570, an i signature corresponding to the processed and unhashed i content may be generated. For example, the first network device may generate a signature that may be used to authenticate the processing performed to generate the content i, the hashing of the content i−1, the first network device, and/or the first processing device. In some embodiments, the first network device may have access to a private key that may be used to generate the i signature. In these and other embodiments, the i signature may be based on the content i, the hashed i−1, the first signature, a name/header, etc., or any combinations thereof.

At block 575, the i signature may be added to the signature stack of the data packet. For example, the first network device may prepend the i signature to the signature stack, placing the i signature at the top of the signature stack above the i−1 signature.

At block 580, the data packet may be transmitted to another network location. For example, if the processing performed at the block 545 is the last step in the processing chain, the first network device may transmit the data packet to a data consumer, or a network device in communication with the data consumer. As another example, if there are additional steps in the processing chain, the first network device may transmit the data packet to a network device associated with the next step in the processing chain. Such a network device may be the device to perform the next processing step or may be associated with a processing device to perform the next processing step. If the next network location is the data consumer, the method 500 may end. If the next network location is another network location, the method 500 may continue to block 510 (via element C, continuing on at FIG. 5A) for a similar process at a next network device.

In these and other embodiments, the size of the content stack may be limited in size based on the number of steps in the processing chain. For example, the content stack may be limited to:

Length=(hash*(k−1))+final data where Length represents the size of the content stack of the data packet, hash represents the size of the output of the hashing algorithm, k represents the number of steps in the processing chain, and final data represents the size of the final data.

Modifications, additions, or omissions may be made to the method 500 without departing from the scope of the present disclosure. For example, the operations of the method 500 may be implemented in differing order. For example, the blocks 545 and 550 may be reversed, and/or the block 565 may be performed anywhere between block 545 and 570. Additionally or alternatively, two or more operations may be performed at the same time. For example, blocks 545, 550, and 565 may be done simultaneously. Furthermore, the outlined operations and actions are only provided as examples, and some of the operations and actions may be optional, combined into fewer operations and actions, or expanded into additional operations and actions without detracting from the essence of the disclosed embodiments. For example, any of blocks 510, 515, 520, 530, 535, 540, 550, 555, 565, 570, and 575 may be removed.

Figure 6A:
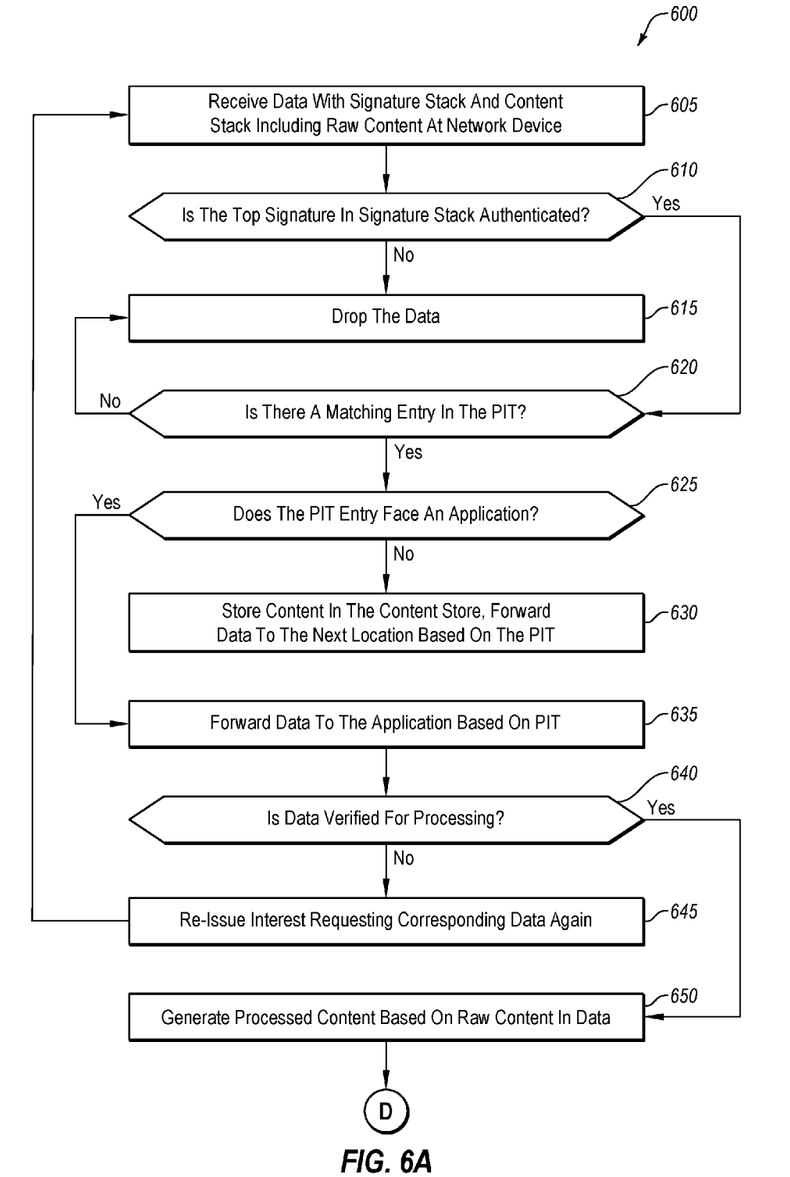
FIGS. 6A and 6B are a flowchart of an example method for verifying a packet in an information centric networking (ICN) network.
Figure 6B:
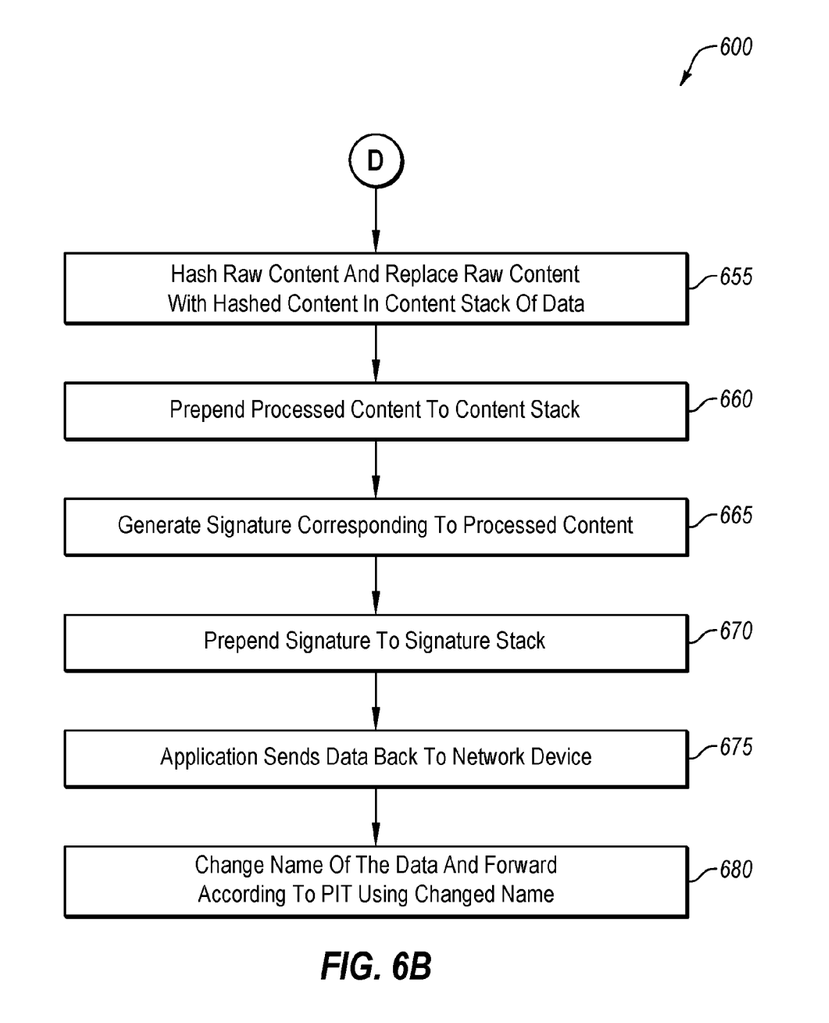

FIGS. 6A and 6B are a flowchart of an example method 600 for verifying a packet in an ICN network, in accordance with at least one embodiment of the present disclosure. The method 600 may be performed by any suitable system, apparatus, or device. For example, the system 100 of FIG. 1 or one or more of the components thereof or the system 200 of FIG. 2 or one or more of the components thereof may perform one or more of the operations associated with the method 600. In these and other embodiments, program instructions stored on a computer readable medium may be executed to perform one or more of the operations of the method 600.

At block 605, a Data with a signature stack and a content stack including raw content may be received at a first network device. For example, an initial network device may forward the Data with raw content to the first network device based on a process chain.

At block 610, a determination may be made as to whether the top signature in the signature stack is authenticated. For example, the first network device may verify whether a security flag has been set in the packet authenticating the top signature. Additionally or alternatively, the first network device may verify that the top signature is consistent with a public key associated with the initial network device. As another example, the first network device may verify that the Data was received from within a trusted zone. If the signature is authenticated, the method 600 may proceed to block 620, and if the signature is not authenticated the method 600 may proceed to block 615.

At block 615, the Data may be dropped. For example, if the network device has determined that the Data is of questionable authenticity (e.g., at block 610) or is unrequested by the particular network device (e.g., at block 620), the first network device may discard the Data.

At block 620, a determination may be made as to whether there is a matching entry in the PIT for the Data. For example, the first network device may compare the name of the Data with entries in the PIT of the first network device. If there is a matching entry in the PIT for the Data, the method 600 may proceed to the block 625. If there is not a matching entry in the PIT for the Data, the method 600 may proceed to the block 615 and drop the data.

At block 625, a determination may be made as to whether the PIT entry faces an application. For example, the first network device may determine whether the PIT entry has an entry for an application operating on the first network device or an application operating on an associated processing device. For example, a first interface identified in the PIT entry may be a logical interface to an application operating on the first network device. As another example, a second interface identified in the PIT entry may identify a connection to a processing device associated with the first network device. If the PIT entry does not face an application, the method 600 may proceed to the block 630. If the PIT entry does face an application, the method 600 may proceed to the block 635.

At block 630, the content of the Data may be stored in the Content Store such that other Interests received at the first network device may access the content from the Content Store rather than having to forward on the Interest to another network location. The Data may also be forwarded according to the PIT entry. For example, the first network device may store the content of the Data in the Content Store and may analyze the PIT entry for interfaces that had received requests for the content in the Data.

At block 635, the Data may be forwarded to the application based on the PIT entry. For example, the first network device may provide the Data to an application operating on the first network device or to an associated processing device over the interface identified in the PIT entry.

At block 640, a determination may be made as to whether the Data is verified for processing. The block 640 may be similar or analogous to the block 530 of FIG. 5A. For example, the network device and/or the associated processing device may analyze the content of the Data to verify that the content to be used in the processing of the processing chain is sufficient and has not been corrupted or been sent incompletely. If the content of the Data is not verified, the method 600 may proceed to the block 645. If the content of the Data is verified, the method 600 may proceed to the block 650.

At block 645, an Interest for the content corresponding to the Data may be re-issued. For example, the application may issue an Interest to the first network device requesting the content of the Data again. The first network device may update the PIT of the first network device accordingly and may forward the Interest according to the FIB. The method 600 may proceed to the block 605 when the Data is re-received due to the Interest being forwarded.

At block 650, processed content may be generated based on the raw content of the Data. For example, the application operating on the first network device or the processing device may perform a processing step of the processing chain. The block 650 may be similar or analogous to the block 545 of FIG. 5A. After block 650, the method 600 may continue via element D to FIG. 6B.

At block 655, (continuing from element D on FIG. 6B) raw content of the Data may be hashed and the hashed content may replace the raw content in the content stack of the Data. For example, the first network device or the processing device may hash the raw content and update the Data accordingly. The block 655 may be similar or analogous to the blocks 550 and 555 of FIG. 5B.

At block 660, the processed content may be prepended to the content stack of the Data. For example, the first network device or the processing device may add the processed content to the top of the content stack. The block 660 may be similar or analogous to the block 560 of FIG. 5B.

At block 665, a signature corresponding to the processed content may be generated. For example, the first network device or the processing device may generate the signature based on the processed content. The block 665 may be similar or analogous to the block 570 of FIG. 5B.

At block 670, the signature corresponding to the processed content may be prepended to the signature stack. For example, the first network device or the processing device may add the signature to the top of the signature stack. The block 670 may be similar or analogous to the block 575 of FIG. 5B.

At block 675, the Data may be sent back to the first network device from the application. For example, the application may send the revised Data back across the interface that provided the Data to the application. In some embodiments, the interface may be a logical interface on the first network device. Additionally or alternatively, the interface may be the interface connecting the processing device and the first network device.

At block 680, the first network device may change the name of the Data and forward the Data according to the PIT using the changed name. For example, the first network device may change the name of the Data to reflect that the step in the processing chain has been performed. The first network device may then compare the modified name to entries in the PIT. For example, there may be an entry in the PIT requesting the first network device forward the revised Data along an interface towards the next step in the processing chain. The first network device may forward the Data according to an entry in the PIT based on the changed name. In these and other embodiments, if the revised Data represents a completion of the processing chain, the PIT entry may direct the Data towards a data consumer requesting the completely processed content.

Modifications, additions, or omissions may be made to the method 600 without departing from the scope of the present disclosure. For example, the operations of the method 600 may be implemented in differing order. For example, the blocks 650 and 655 may be reversed. Additionally or alternatively, two or more operations may be performed at the same time. For example, blocks 650 and 655 may be done simultaneously. Furthermore, the outlined operations and actions are only provided as examples, and some of the operations and actions may be optional, combined into fewer operations and actions, or expanded into additional operations and actions without detracting from the essence of the disclosed embodiments. For example, any of blocks 610, 655, 660, 665, and 670 may be removed.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A first network device including a processor and non-transitory memory, the memory including instructions that when executed by the processor cause the processor to implement one or more operations, the operations including:
   receiving a data packet including a signature stack and a content stack with unhashed first content;
   providing the unhashed first content to a processing device to perform processing of the unhashed first content;
   hashing the unhashed first content to generate hashed first content;
   replacing the unhashed first content with the hashed first content in the content stack;
   receiving second content from the processing device, the second content generated by performing processing on the unhashed first content, wherein the second content is different from the unhashed first content and the hashed first content;
   adding the second content to the content stack;
   generating a signature of the hashed first content;
   adding the signature to the signature stack; and
   transmitting the data packet to a second network device.

2. The first network device of claim 1, wherein the operations further include changing a name of the data packet after adding the second content to the content stack.

3. The first network device of claim 1, wherein the first network device and the processing device are included in a single device.

4. The first network device of claim 1, wherein the processing device is configured to validate the unhashed first content.

5. The first network device of claim 1, wherein, after determining that the unhashed first content is not validated, the operations further include re-requesting the unhashed first content.

6. A method of updating a data packet, the method comprising:
   receiving a data packet from a first network location, the data packet including a content stack with unhashed first content and a signature stack with a first signature corresponding to the unhashed first content, the first signature generated at the first network location;
   performing a processing on the unhashed first content to generate second content, wherein the second content is different from the unhashed first content and the hashed first content;
   hashing the unhashed first content to generate hashed first content;
   replacing the unhashed first content with the hashed first content in the content stack;
   adding the second content to the content stack;
   generating a second signature corresponding to the second content;
   adding the second signature to the signature stack; and
   transmitting the data packet to a second network location.

7. The method of claim 6, wherein the processing is a first processing, the method further comprising:
   at the second network location, performing a second processing on the second content to generate a third content;
   at the second network location, hashing the second content to generate hashed second content;
   at the second network location, replacing the second content with the hashed second content in the content stack;
   at the second network location, adding the third content to the content stack;
   at the second network location, generating a third signature corresponding to the third content; and
   at the second network location, adding the third signature to the signature stack.

8. The method of claim 7, further comprising, at the second network location, authenticating only a top signature in the signature stack of the data packet.

9. The method of claim 8, further comprising, the second network location setting a security flag indicating the top signature has been successfully authenticated.

10. The method of claim 7, further comprising, at the second network location, merging a first branch of a processing chain that yields the third content with a second branch of the processing chain that yields a fourth content, the merging comprising:
aggregating all content from the first branch into a first entry in a merged content stack;
aggregating all content from the second branch into a second entry in the merged content stack;
aggregating all signatures from the first branch into a first entry in a merged signature stack; and
aggregating all signatures from the second branch into a second entry in the merged signatures stack.

11. The method of claim 6, wherein the second signature is further based on the hashed first content, the first signature, and a name of the data packet.

12. The method of claim 6, wherein hashing the first content includes hashing both the first content and a first header associated with the first content.

13. The method of claim 6, wherein adding the second signature to the signature stack includes prepending the second signature to the signature stack.

14. The method of claim 6, wherein adding the second content to the content stack includes prep ending the second content to the content stack.

15. The method of claim 6, wherein the data packet is transmitted to the second network location according to a pending interest table.

16. The method of claim 6, wherein:
the signature stack includes signatures from network locations outside of a trusted zone and excludes signatures from network locations inside of the trusted zone; and
the content stack includes hashed content for processing of content performed outside of the trusted zone and excludes hashed content for processing of content performed inside of the trusted zone.

17. A non-transitory computer-readable storage device with computer-executable instructions stored thereon that, when executed by one or more computer processors, cause the one or more computer processors to perform operations comprising:
receiving a data packet including a signature stack and a content stack with unhashed first content;
providing the unhashed first content to a processing device to perform processing of the unhashed first content;
hashing the unhashed first content to generate hashed first content;
replacing the unhashed first content with the hashed first content in the content stack;
receiving second content from the processing device, the second content generated by performing processing on the unhashed first content, wherein the second content is different from the unhashed first content and the hashed first content;
adding the second content to the content stack;
generating a signature of the hashed first content;
adding the signature to the signature stack; and
transmitting the data packet to a second network device.

18. The non-transitory computer-readable storage device of claim 17, wherein the operations further include changing a name of the data packet after adding the second content to the content stack.

19. The non-transitory computer-readable storage device of claim 17, wherein the operations further include validating the unhashed first content.

20. The non-transitory computer-readable storage device of claim 17, wherein the operations further include, after determining that the unhashed first content is not validated, re-requesting the unhashed first content.

* * * * *